United States Patent [19]
Watari et al.

[11] Patent Number: 5,642,163
[45] Date of Patent: Jun. 24, 1997

[54] IMAGING APPARATUS FOR SWITCHING THE ACCUMULATIVE ELECTRIC CHARGE OF AN IMAGE PICKUP DEVICE

[75] Inventors: Takashi Watari, Kobe; Masaaki Nakayama, Hirakata, both of Japan

[73] Assignee: Matsushita Electric Industrial Co., Ltd., Kadoma, Japan

[21] Appl. No.: 521,970

[22] Filed: Aug. 31, 1995

[30] Foreign Application Priority Data

Aug. 31, 1994 [JP] Japan ................................ 6-206755

[51] Int. Cl.⁶ .................................................. H04N 5/335
[52] U.S. Cl. ........................ 348/297; 348/311; 348/298
[58] Field of Search ................................ 348/222, 294, 348/297, 298, 311, 362, 314, 303, 308; 359/214; H04N 5/335

[56] References Cited

U.S. PATENT DOCUMENTS

| | | | |
|---|---|---|---|
| 3,953,733 | 4/1976 | Levine | 250/330 |
| 4,399,464 | 8/1983 | Hix et al. | 348/297 |
| 4,544,848 | 10/1985 | Kawasaki et al. | 348/298 |

FOREIGN PATENT DOCUMENTS

| | | | |
|---|---|---|---|
| 165270 | 6/1989 | Japan | H04N 5/335 |
| 238385 | 9/1989 | Japan | H04N 5/335 |

*Primary Examiner*—Glenton B. Burgess
*Attorney, Agent, or Firm*—Ratner & Prestia

[57] ABSTRACT

An imaging apparatus for focusing a light onto an image to generate an electric signal representing thus focused light image with a broader dynamic range includes an image pickup device, an image pickup device controller, and an accumulating charge selector. The image pickup device control controller controls an amount of electric charge that image pickup device can accumulate therein. The accumulating charge selector switches the image pickup deice to a first accumulative electric charge amount level and to a second accumulative electric charge amount level greater than said first accumulative electric charge amount level within said imaging period.

21 Claims, 13 Drawing Sheets

IMAGING APPARATUS FOR SWITCHING THE ACCUMULATIVE ELECTRIC CHARGE OF AN IMAGE PICKUP DEVICE

BACKGROUND OF THE INVENTION

1. Field of the Invention

The present invention relates to an imaging apparatus for focusing a light onto an image to generate an electric signal representing thus focused light image with a broader dynamic range.

2. Description of the Prior Art

In FIG. 12, a conventional imaging apparatus is shown. The conventional imaging apparatus Ic includes an image pickup device 1, an analog signal processor 2, an analog to digital converter 3, and an image pickup device controller 4. The image pickup device focuses a light onto an object image to produce an electric signal based on thus obtained image. The imaging pickup device 1 accumulates the electric charge according to the quantity of light incident thereto for one imaging period. The imaging pickup device 1 outputs the accumulated electric charge as an image signal Sd representing the magnitude of thus accumulated electric charge, and further reset the amount of electric charge accumulated therein to zero.

In FIGS. 13 and 14, electric charge accumulation characteristics of the image pickup device 1 are shown. FIG. 13 shows the quantity of accumulated electric charge with respect to incidental period. FIG. 14 shows the quantity of accumulated electric charge with respect to the quantity of incidental light. In both of figures, "Q0" at the vertical axis indicates a saturation level which is a maximum accumulative electric charge of the image pickup device 1. Note that the amount Dp of incidental light Qinc at the time when the image pickup device reaches the saturation level Q0 represents a dynamic range of the image pickup device.

In FIG. 12, the analog signal processor 2 applies various process such as a noise filtration, a gamma correction, and amplification to the image signal Sd. The analog to digital converter 3 converts the electric signal processed by the analog signal processor 2 into a digital signal which will be transferred to the externals.

The image pickup device controller 4 has an electric charge accumulation controller 4a and an electric charge transmission controller 4b. The accumulation controller 4a determines the quantity of the electric charge which the image pickup device 1 accumulates therein. The transmission controller 4b controls the image pickup device 1 to transmit the electric charge accumulated therein as a signal Sd to the analog signal processor 2.

With reference to FIG. 15, the operation of the image pickup device controller 4 when the image pickup device is comprised of a photo diode and a vertical CCD (charge coupled device) is described. The accumulation controller 4a produces a charge accumulation control signal Sa indicating the quantity of the electric charge to be accumulated in the photo diode of the image pickup device 1.

The charge accumulation control signal Sa having pulses changing between a first level V0 and a second level V2 by a predetermined period. The first level V0 corresponds to the maximum accusative charge corresponding to the saturation level Q0. The second level V2 corresponds to "zero" charge level Q2. One period between each pulse of the signal Sa corresponds to one vertical blanking period of the image signal Sd.

The transmission controller 4b produces a first charge transfer signal Sb similar to the charge accumulation control signal Sa. The first charge transfer signal Sb has the same frequency as, but is delayed by a predetermined period Ta from the signal Sa. For this period Ta, the image pickup device 1 accumulates the electric charge therein. The transmission controller 4b further produces a second charge transfer signal Sc which is a combination of plural pulses of vertical transmission signal and horizontal transmission signal. Each batch of plural pulses corresponds to a signal vertical blanking period.

The photo diode is set to the saturation level Q0 and to zero level Q2 at the leading edge and trailing edge, respectively, of the charge accumulation control signal Sa. At the trailing edge of the signal Sa, the photo diode begins to accumulate the electric charge, and then transmits thus accumulated electric charge to the vertical CCD at the leading edge of the signal Sb. Specifically, during the accumulation period Ta between the pulses of signals Sa and Sb, the photo diode accumulates the electric charge and outputs. On receipt of each pulse of the second charge transfer signal Sc, the vertical CCD outputs the electric charge from the left top to the right bottom thereof, line by line, as the image signal Sd.

As apparent from the above, the image pickup device 1 can not accumulate or outputs the electric charge more than the saturation level Q0 even if the light is being incident thereto over this level Q0. In other words, when a light stronger than a light level that is determined according to a property of the image pickup device 1 is incident to the pickup device 1, it is impossible to express the strength of that incidental light as the quantity of electric charge accumulated in the image pickup device 1.

Therefore, according to the conventional imaging apparatus Ic, the digital signal output from the A/D converter 3 can not represent the strength of the light that has been incident to the image pickup device 1 beyond the saturation level Q0 of the image pickup device 1. In other words, it is impossible to reproduce an incidental image light whose brightness band is beyond a brightness range that is determined based on this saturated electric charge quantity. Thus, an imaging which can reproduce an incidental light with a broader dynamic range is needed.

SUMMARY OF THE INVENTION

The object of the present invention is therefore to provide an imaging apparatus that solves these problems.

The present invention has been developed with a view to substantially solving the above described disadvantages and has for its essential object to provide an improved imaging apparatus.

In order to achieve the aforementioned objective, an imaging apparatus comprises an image pickup device for producing an image signal indicative of an object image for a predetermined imaging period; a control means for controlling an amount of electric charge that said image pickup device can accumulate therein; and an accumulative electric charge amount switch means for switching said image pickup device to a first accumulative electric charge amount level and to a second accumulative electric charge amount level greater than said first accumulative electric charge amount level within said imaging period.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
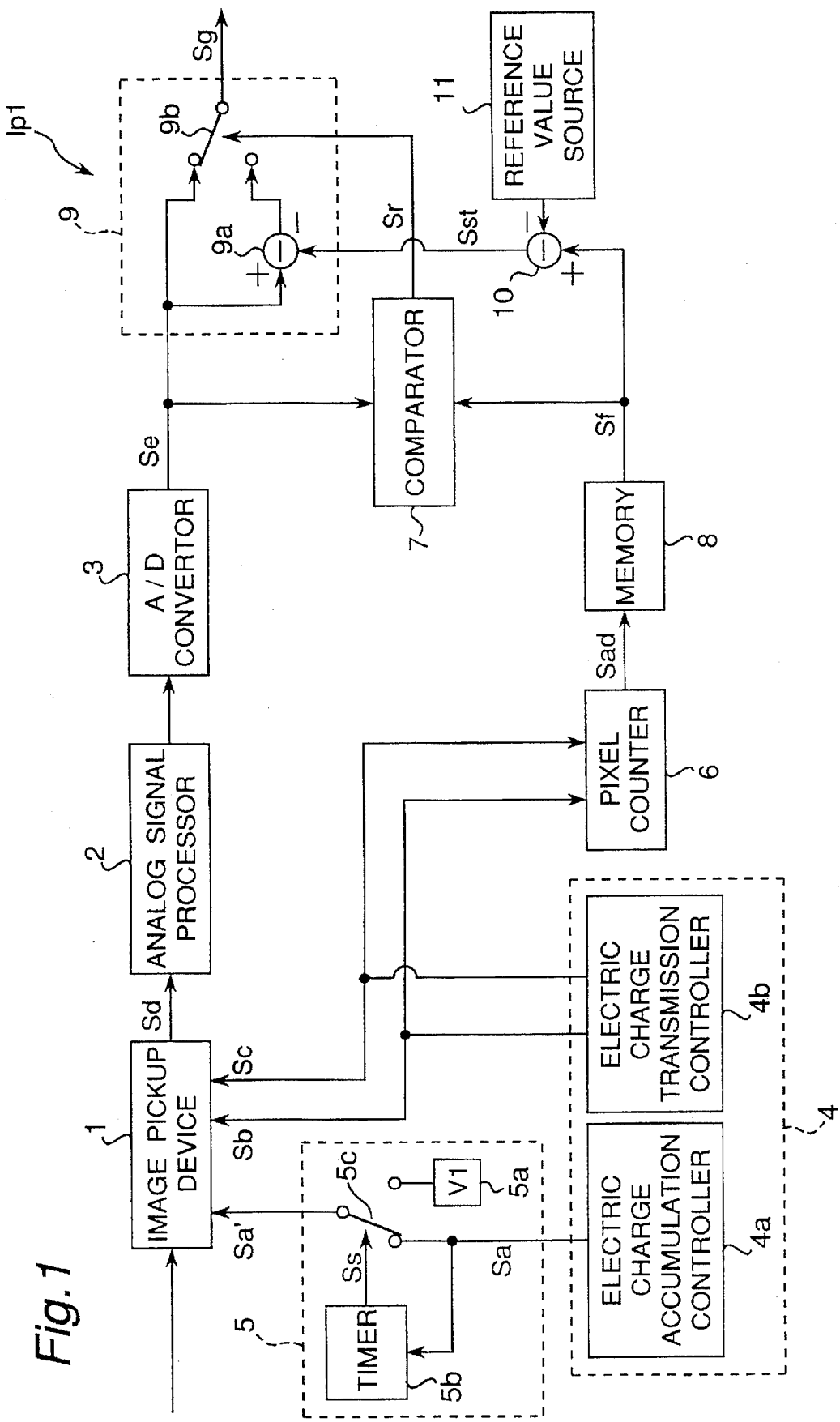
FIG. 1 is a block diagram showing an imaging apparatus according to a first embodiment of the present invention.

First embodiment:

Referring to FIG. 1, an imaging apparatus according to a first embodiment of the present invention is shown. The imaging apparatus Ip1 includes an image pickup device 1 such as a CCD (charge-coupled device) for focusing a light into an object image to produce an electric signal based on thus obtained image. The imaging pickup device 1 accumulates the electric charge according to the quantity of light incident thereto for one imaging period. The imaging pickup device 1 outputs the accumulated electric charge as an image signal Sd representing the magnitude of thus accumulated electric charge, and further reset the amount of electric charge accumulated therein to zero.

An analog signal processor 2 is connected to the image pickup device 1 for receiving the image signal Sd therefrom. The analog signal processor 2 applies various process such as a noise filtration, a gamma correction, and amplification to the image signal Sd.

An analog to digital (A/D) converter 3 is connected to the analog signal processor 2 for receiving the image signal Sd therefrom. The A/D converter 3 converts the image signal Sd processed by the analog signal processor 2 into a digital signal Se.

An image pickup device controller 4 is provided for controlling the operation of the image pickup device 1. The image pickup controller 4 has an electric charge accumulation controller 4a and an electric charge transmission controller 4b. The accumulation controller 4a produces a charge accumulation control signal Sa indicating the quantity of the electric charge to be accumulated in the photo diode of the image pickup device 1. In other words, the signal Sa represents a reference voltage Vsub for the over flow drain (OFD) control of the image pickup device 1. The transmission controller 4b produces a first charge transfer signal Sb and a second charge transfer signal Sc.

An accumulating charge selector 5 is provided between the image pickup device 1 and the electric charge accumulation controller 4a for receiving the charge accumulation control signal Sa. The accumulating charge selector 5 includes a first reference voltage source 5a, a timer 5b, and a select switch 5c. The first reference voltage source 5a supplies a first reference voltage V1 corresponding to an intermediate level between the first and second levels V0 and V2. The timer 5b is connected to the controller 4a for receiving the signal Sa therefrom to produce a selection signal Ss indicating either one of the levels V2 and V1. The select switch 5c is connected to the timer 5b for receiving the selection signal Ss. The switch 5c connects either one of the electric charge accumulation controller 4a and the first reference voltage source 5a based to the selection signal Ss to apply the selected level V2 or V1 to the image pickup device 1. As a result, a modified charge accumulation control signal Sa' which sequentially changes its level from the level V1 to level V2 through the predetermined period Tc.

Figure 16:
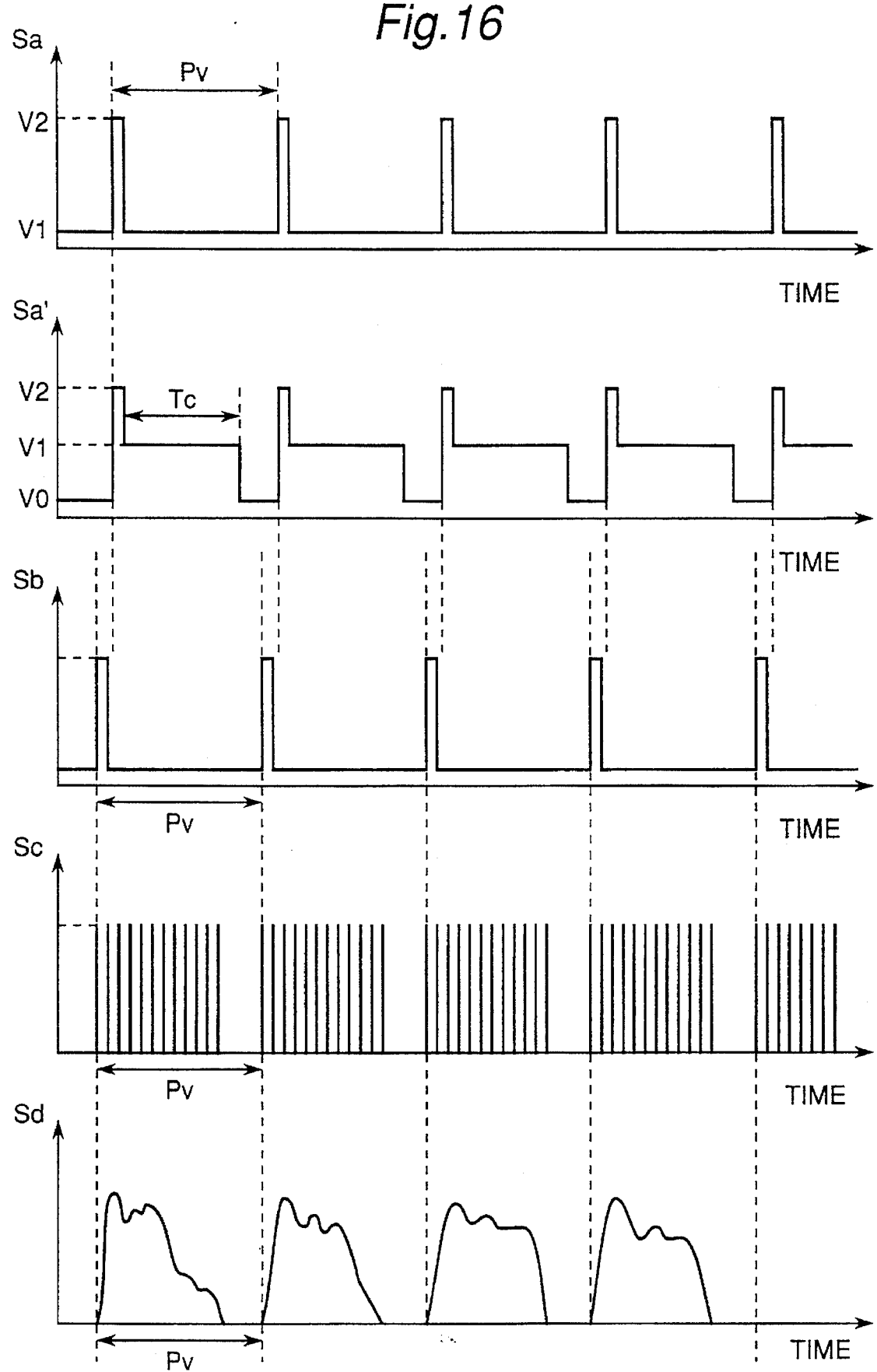
FIG. 16 is a graph showing various wave forms appeared in the imaging apparatus of FIG. 1.

Referring to FIG. 16, wave forms of signal Sa, Sa', Sb, and Sc are shown. The charge accumulation control signal Sa is a pulse signal having pulses changing between a first level V0 and a second level V2 by a predetermined period. The first level V0 corresponds to the maximum accumulative charge corresponding to the saturation level Q0. The second level V2 corresponds to "zero" charge level Q2. One period Pv between each pulse of the first pulse signal Sa corresponds to one imaging period such as one vertical blanking period of the image signal Sd, and is usually set to 1/60 second for example.

The first charge transfer signal Sb is a pulse signal similar to the charge accumulation control signal Sa, but is delayed by a predetermined period Ta from the signal Sa. For this period Ta, the image pickup device 1 accumulates the electric charge therein. The second charge transfer signal Sc which is a combination of plural pulses of vertical transmission signal and horizontal transmission signal. Each batch of plural pulses corresponds to the one imaging period Pv.

The photo diode of the image pickup device 1 is set to the saturation level Q0 and to zero level Q2 at the leading edge and trailing edge, respectively, of the charge accumulation control signal Sa. At the trailing edge of the signal Sa, the photo diode begins to accumulate the electric charge, and then transmits thus accumulated electric charge to the vertical CCD at the leading edge of the signal Sb. Specifically, during the accumulation period Ta between the pulses of signals Sa and Sb, the photo diode accumulates the electric charge and outputs. On receipt of each pulse of the second charge transfer signal Sc, the vertical CCD outputs the electric charge from the left top to the right bottom thereof, line by line, as the image signal Sd.

Referring back to FIG. 1, a pixel counter 6 is connected to the electric charge transmission controller 4b for receiving the signals Sb and Sc therefrom. The pixel counter 6 counts the number of pixels based on the horizontal transfer signal of the signal Sc, and is reset by the signal Sb. Thus, the pixel counter 6 produce an address signal Sad indicative of the address of current pixel of the image signal Sd.

A memory 8 is connected to the pixel counter 6 for receiving the address signal Sad therefrom. The memory 8 stores the accumulated charge data indicative of the electric charge which is actually accumulated in the image pickup device 1. This accumulated charge data is previously converted from the analog to digital data, and is stored in the memory 8. On receipt of the address data Sad, the memory 8 outputs a reference charge signal Sf indicative of a reference amount of the electric charge with respect to the current pixel address. As a result, the pixel of the signal Se which is currently output from the A/D convertor 3 is the same as the pixel of the signal Sf which is currently output from the memory 8.

A comparator 7 is connected to the A/D converter 3 and the memory 8 for receiving the digitalized image signal Se and the reference charge signal Sf therefrom, respectively. The comparator 7 compares these signals Se and Sf to produces a result signal Sr indicative of the comparison result.

A first reference value source 11 is provided for applying a first reference value signal indicative of, for exampl, a mean value of all the pixel data included in the signal Sf. In this example, the first reference value signal closes to the majority of the pixels within the image actually obtained.

A subtractor 10 is connected to the memory 8 for receiving the signals Sf therefrom and, and is further connected to a reference value source 11 for receiving the reference value signal therefrom to produce a subtraction signal Sst indicative of a difference therebetween. When the first reference value source 11 stores the mean value of all the pixels in the singal Sf, the value of signal Sst is small.

A noise remover 9 is connected to the A/D converter 3, the comparator 7, and the subtractor 10 for receiving the signals Se, St, and Sst therefrom, respectively. The noise remover 9 includes an subtractor 9a and a select switch 9b. The subtractor 9a is connected to the A/D converter 3 and to the subtractor 10 for subtracting the signal Sst from the digitized image signal Sd to produce a second subtraction signal. The select switch 9b is connected to the comparator 7 for selectively connecting the subtractor 9a based on the result signal Sr.

When the digitized image signal Se is greater than the reference charge signal Sf, the switch 9b selects to output the subtracted digitized signal (Se-Sst) produced by the subtractor 9a as an final image signal Sg therefrom. However, when the digitized image signal Se is equal to or less than the reference charge signal Sf, the switch 9b selects the digitized image signal Se from the converter 3.

Figure 2:
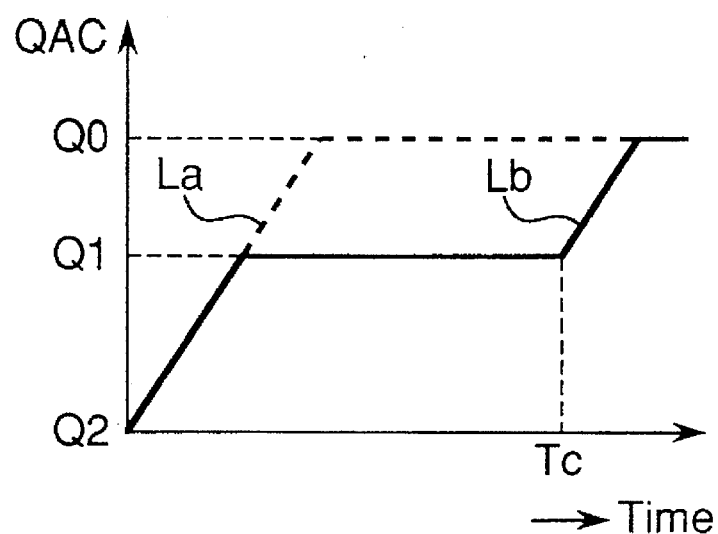
FIG. 2 is a graph showing a relationship between the electric charge accumulated in an image pickup device used in the imaging apparatus of FIG. 1 with respect to the charging time.
Figure 3:
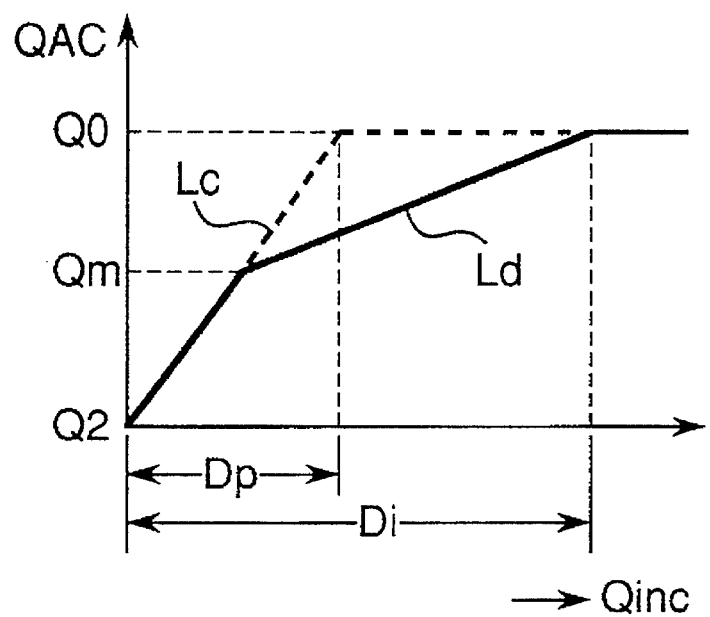
FIG. 3 is a graph showing a relationship between the electric charge accumulated in the image pickup device of FIG. 1 with respect to the quantity of light incident thereto.

Referring to FIGS. 2 and 3, electric charge accumulation characteristics of the image pickup device 1 of FIG. 1 are shown. In both figures, "Q0", "Q1(Qm)", and "Q2" at the vertical axis indicate the maximum, intermediate, and zero accumulative levels of the image pickup device 1 of FIG. 1, respectively, and correspond to the levels V0, V1, and V2, respectively.

Figure 12:
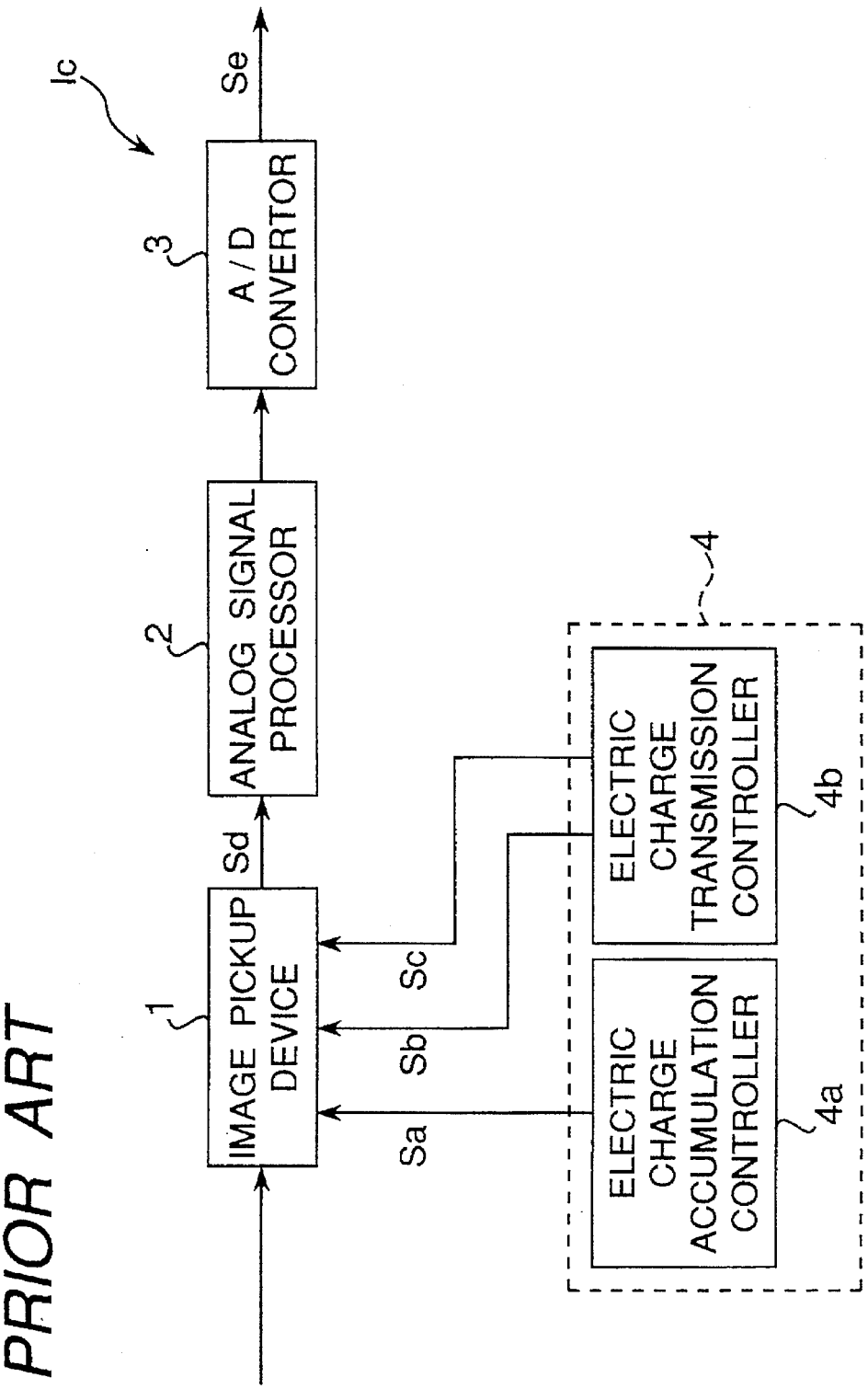
FIG. 12 is a block diagram showing a conventional imaging apparatus.
Figure 13:
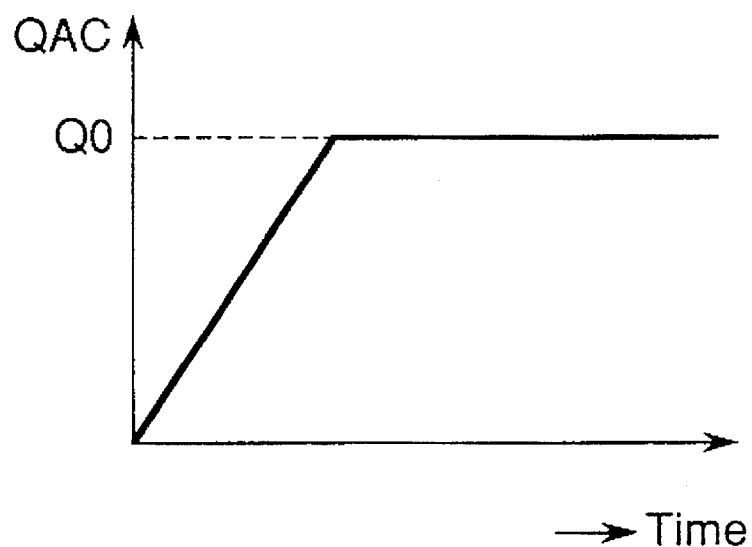
FIG. 13 is a graph showing a relationship between the electric charge accumulated in an image pickup device used in the imaging apparatus of FIG. 12 with respect to the charging time.
Figure 14:
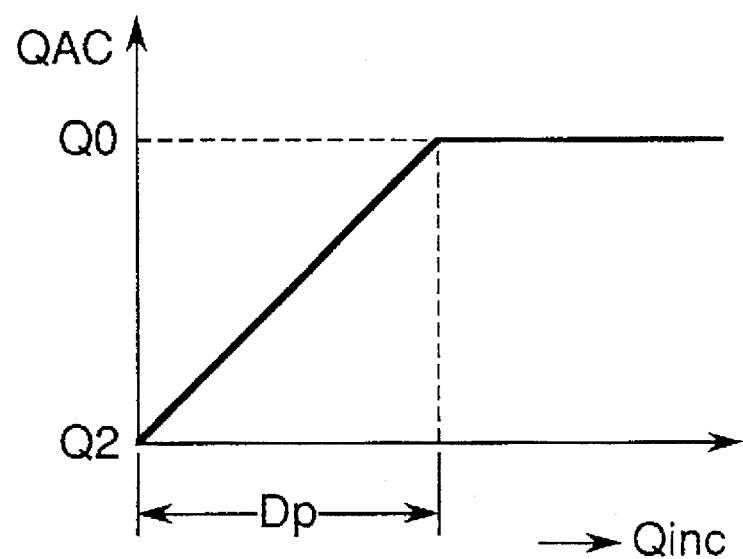
FIG. 14 is a graph showing a relationship between the electric charge accumulated in the image pickup device of FIG. 12 with respect to the quantity of light incident thereon.
Figure 15:
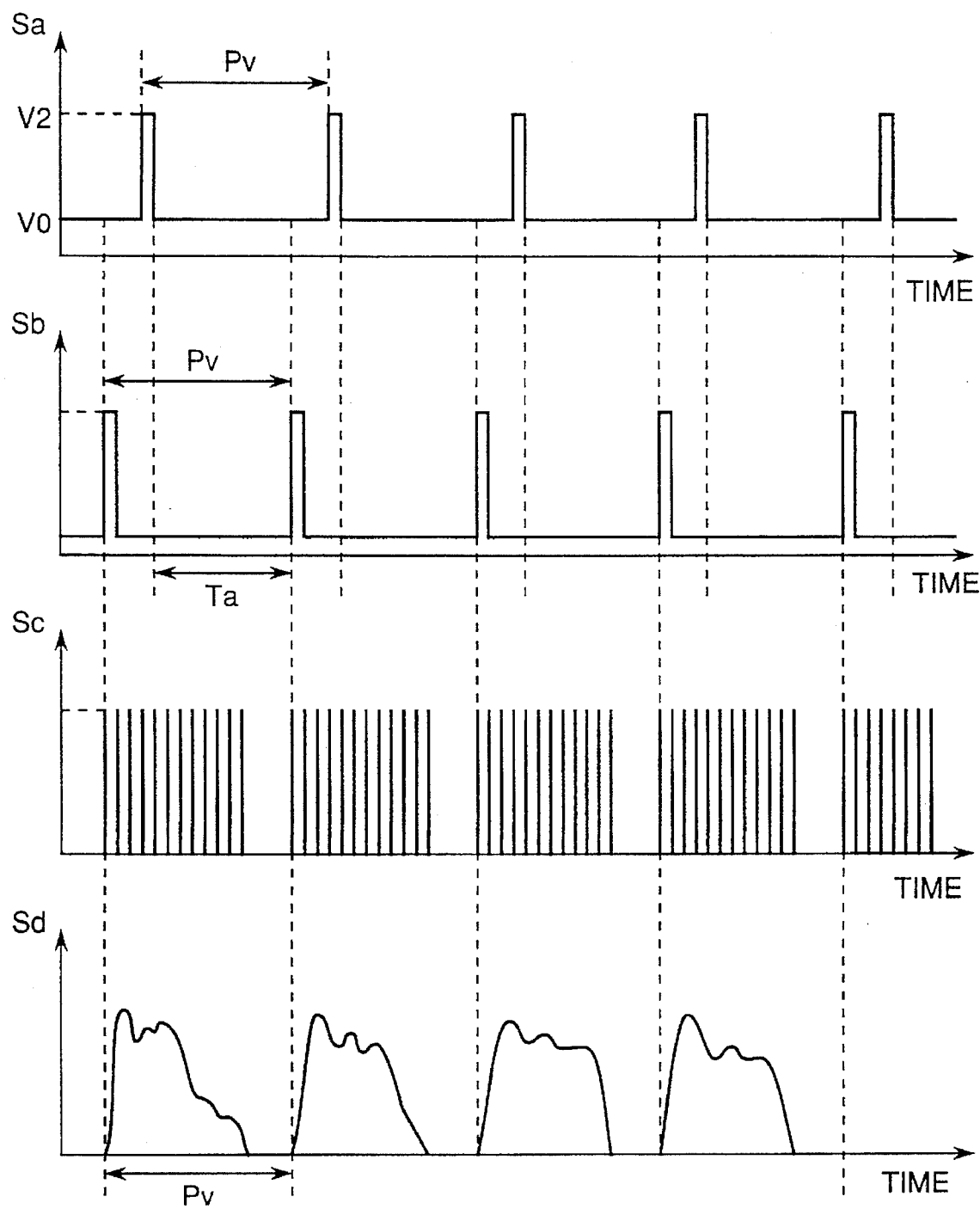
FIG. 15 is a graph showing various signals appeared in the imaging apparatus of FIG. 12.

In FIG. 2, the quantity of accumulated electric charge QAC of the image pickup device according to the present invention with respect to incidental period is indicated by a solid line Lb. A dot line La indicates the same of the conventional imaging apparatus Ip of FIG. 12. As specifically shown by the solid line Lb, the image pickup device linearly increase the accumulative charge amount along with the line La until reaching the intermediate saturation level Q1. Thereafter, the image pickup device will not accumulate more than the level Q1 until a predetermined time Tc has been passed since the start of the charge accumulating operation. Thereafter, the image pickup device resumes to increase the accumulative charge linearly having the same inclination the line La. Finally, the image pickup device reaches saturation level Q0.

In FIG. 3, the quantity of accumulated electric charge QAC of the image pickup device with respect to the quantity of incidental light Qinc is indicated by a solid line Ld. A dot line Lc indicates the same of conventional imaging apparatus Ip of FIG. 12. By keeping the image pickup device at the intermediated saturation level Q1 for a predetermined period shorter than the predetermined period Tc as shown in FIG. 2, the accumulated electric charge to the incidental light Qinc also changes as follows.

The image pickup device 1 linearly increases the accumulative charge amount along with the line Lc until reaching the intermediate saturation level Qm. Thereafter, the image pickup device increase the accumulative charge linearly having a predetermined inclination smaller than that of the line Lc. By reducing the accumulating rate of the image pickup device at the intermediated saturation level Qm, the image pickup device can accumulate the electric charge even after when the image pickup device having no intermediate saturation level Qm reaches the saturation level Q0. In other words, the image pickup device 1 has an dynamic range Di expanded by applying the intermediate saturation level Qm. Specifically speaking, by changing the saturation level of the image pickup device from the first level Qm to the second level Q0 greater than the first level Qm within one imaging period Pv, the dynamic range of the image pickup device can be expanded.

However, even when the accumulative charge level of the image pickup device 1 is set to the intermediate level Qm, the actual amount of electric charge accumulate in the device 1 is not equal to the amount Qm. The actual accumulated amount in the device 1 is subject to some error, and differs from the level Qm at which the device 1 is set. This error or difference will act as noises of the image signal Se. According to the present invention, this noise is removed as follows.

The comparator 7 compares the digitized signal Se with the previously stored actual accumulated charge data with respect to the same pixel based on the address signal Sad from the pixel counter. According to the comparison result indicating the error for the current pixel, a suitable value Sst which produced by the subtractor 10 and reference value source 11 is added or subtracted from the current signal Sd by the select switch 9b. Thus, according to the imaging apparatus of the present invention, the dynamic range can be expanded without an image degradation.

Figure 4:
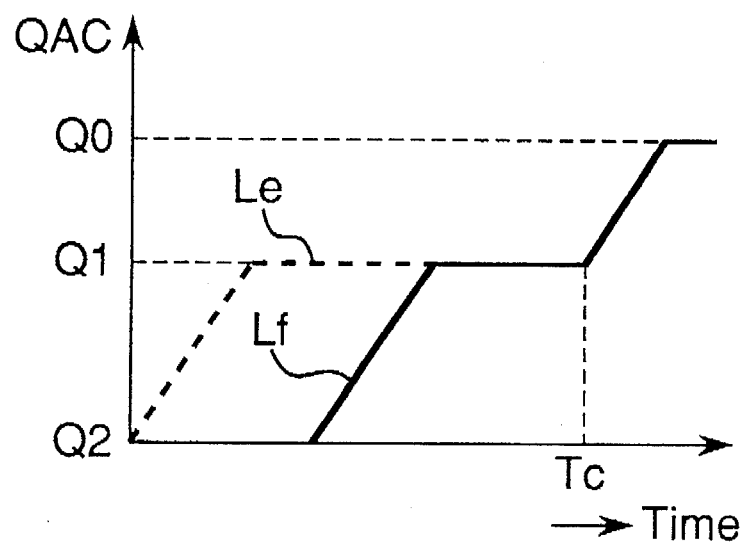
FIG. 4 is a graph showing a relationship between the eclectic charge accumulated in an alternative of the image pickup device of FIG. 1 with respect to the charging time.
Figure 5:
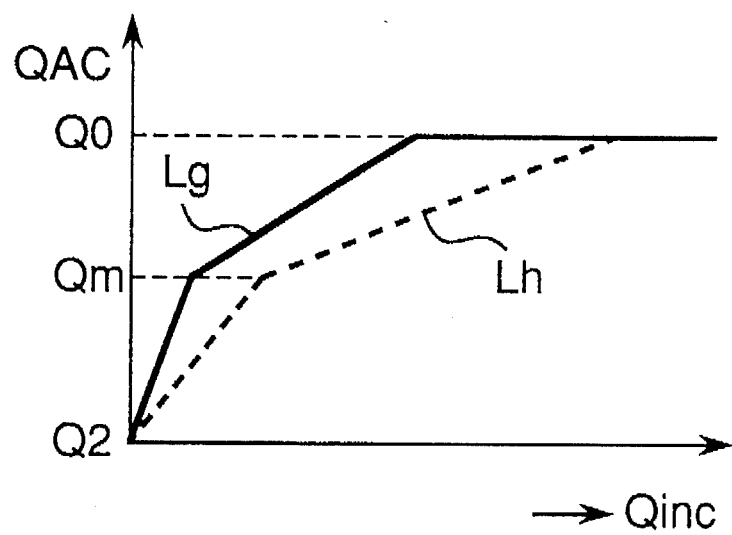
FIG. 5, is a graph showing a relationship between electric charge accumulation characteristics of an alternative of the image pickup device 1 of FIG. 1 with respect to the quantity of light incident thereto.

Referring to FIGS. 4 and 5, electric charge accumulation characteristics of an alternative of the image pickup device 1 of FIG. 1 are shown. In this alternative, the accumulating charge selector 5 operates such that the image pickup device 1 sequentially changes its charge accumulative level in order of the zero level Q2, the intermediate level Q1 and the saturation level Q0 through the predetermined period Tc.

In FIG. 4, the quantity of accumulated electric charge QAC of the image pickup device according to this alternative with respect to incidental period is indicated by a solid line Lf. A dot line Le indicates the line Lb of FIG. 2. As specifically shown by the solid line Lf, the image pickup device 1 does not accumulate at the first period and then linearly increase the accumulative charge amount along with the same inclination of the line Le until reaching the intermediate saturation level Q1. Thereafter, the image pickup device will not accumulate more than the level Qt until the predetermined time Tc. Thereafter, the image pickup device resumes to increase the accumulative charge linearly along with the line Le. Finally, the image pickup device 1 reaches the saturation level Q0.

In FIG. 5, the quantity of accumulated electric charge QAC of the image pickup device with respect to the quantity of incidental light Qinc is indicated by a solid line Lg. A dot line Lh indicates the line Ld of FIG. 3. By keeping the image pickup device at the zero level Q2 and intermediated saturation level Q1 twice, the accumulated electric charge to the incidental light Qinc also changes as follows.

As apparently from FIG. 5, according to this alternative, the dynamic range of the image pickup device 1 can be changed actively, compared with the device 1 described with reference to FIG. 3. Furthermore, the time for the device 1 to accumulate the electric charge can be reduced, as best shown in FIG. 4. As a result, it is possible to obtain the image of the moving object without blurring. Specifically speaking, by changing the saturation level of the image pickup device 1 from the zero level Q2 to the first level Qm, and further to the second level Q0 within one imaging period Pv, the dynamic range of the image pickup device can be expanded actively. Thus, an effect of an electric shutter can be realized.

Figure 6:
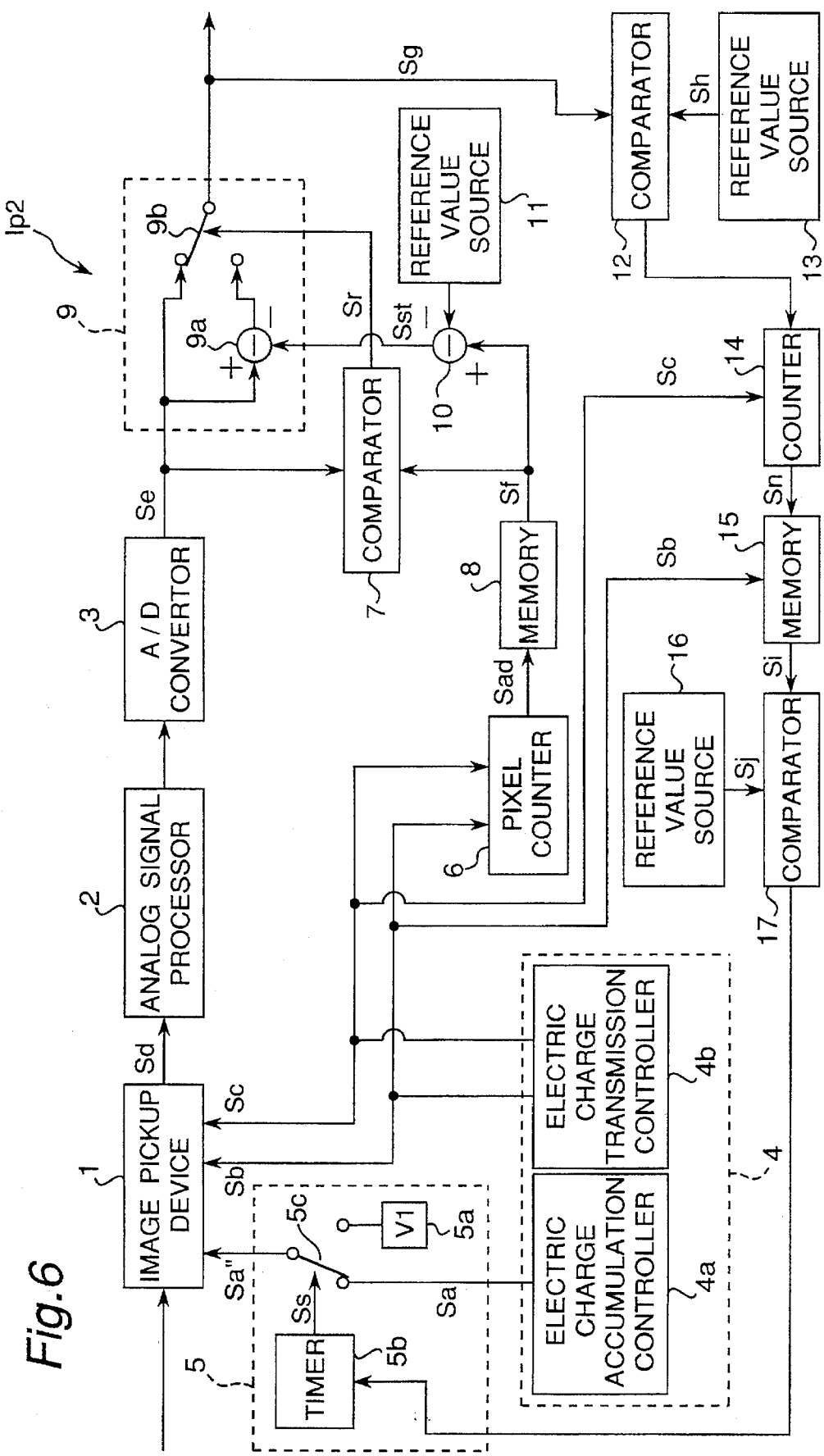
FIG. 6 is a block diagram showing an imaging apparatus according to a second embodiment.

Second embodiment:

Referring to FIG. 6, an imaging apparatus according to a second embodiment of the present invention is shown. The imaging apparatus Ip2 has a construction similar to that of FIG. 1, but the following members are additionally provided.

A second reference value source 13 is provided for supplying a second reference value signal Sh. As the second reference value, the maximum amount that an video camera in the NTSC signal system can outputs is set for example. This is because that the image data greater than such maximum range of video camera is not useful. A second comparator 12 is Connected to the output port of noise remover 9 for receiving the digitized image signal Sg therefrom. The comparator 12 is further connected to the second reference value signals Sh therefrom to compare with the signal Sg and produces a second result signal. When the signal Sg is greater than the signal Sh, the second result signal is High (one). When the signal Sg is equal to or smaller than the signal Sh, the second result signal is Low (zero).

A counter 14 is connected to the second comparator 12 for receiving the second result signal therefrom. Every time when the second result signal becomes High (one), the counter 14 counts up by one to produces a counter signal Sn. The counter 14 is further connected to the electric charge transmission controller 4b for receiving the signal Sc therefrom. On receipt of each of plural pulses of vertical transmission signal and horizontal transmission signal included in the signal, the counter 14 outputs the counter signal Sn corresponding to the current pixel.

A second memory 15 is connected to the second counter 14 and the electric charge transmission controller 4b for receiving the counter signal Sn and the signal Sb therefrom, respectively. On receipt of the signal Sb, and the memory 15 stores the signal Sn. Thereafter, the counter 14 is reset.

A third reference value source 16 is provided for supplying a third reference signal Sj indicative of a third predetermined reference value indicative of any number of pixels in the image siganl Sd. For example, for producing the image signal representing only one or few spot in the black background like a star in the sky, one or few number is adapted as the third reference value Sj. For brighter image, the the thirid referece value is increased. Thus, the third reference value source 16 is set to store any number suitable for the object image. A third comparator 17 is connected to the memory 15 for receiving the signal Si therefrom. The comparator 17 is further connected to the third reference value source 16 for receiving the reference signals Sj therefrom to compare with the signal Si, and produces a third result signal.

The timer 5b of the accumulating charge selector 5 is connected to the third comparator 17 for receiving the third result signal. Based on the third result signal, the timer 5b changes the timing to turn on. When the signal Si is smaller than the signal Sj, the turning on timing of the timer 5b is set to the predetermined time Tc. When the signal Si is greater than the signal Sj, the turning on timing of the timer 5b is set to a predetermined time Tc' shorter than the time Tc. According to the operation of the timer 5b, an modified accumulation control signal Sa" is output to the image pickup device 1.

Figure 17:
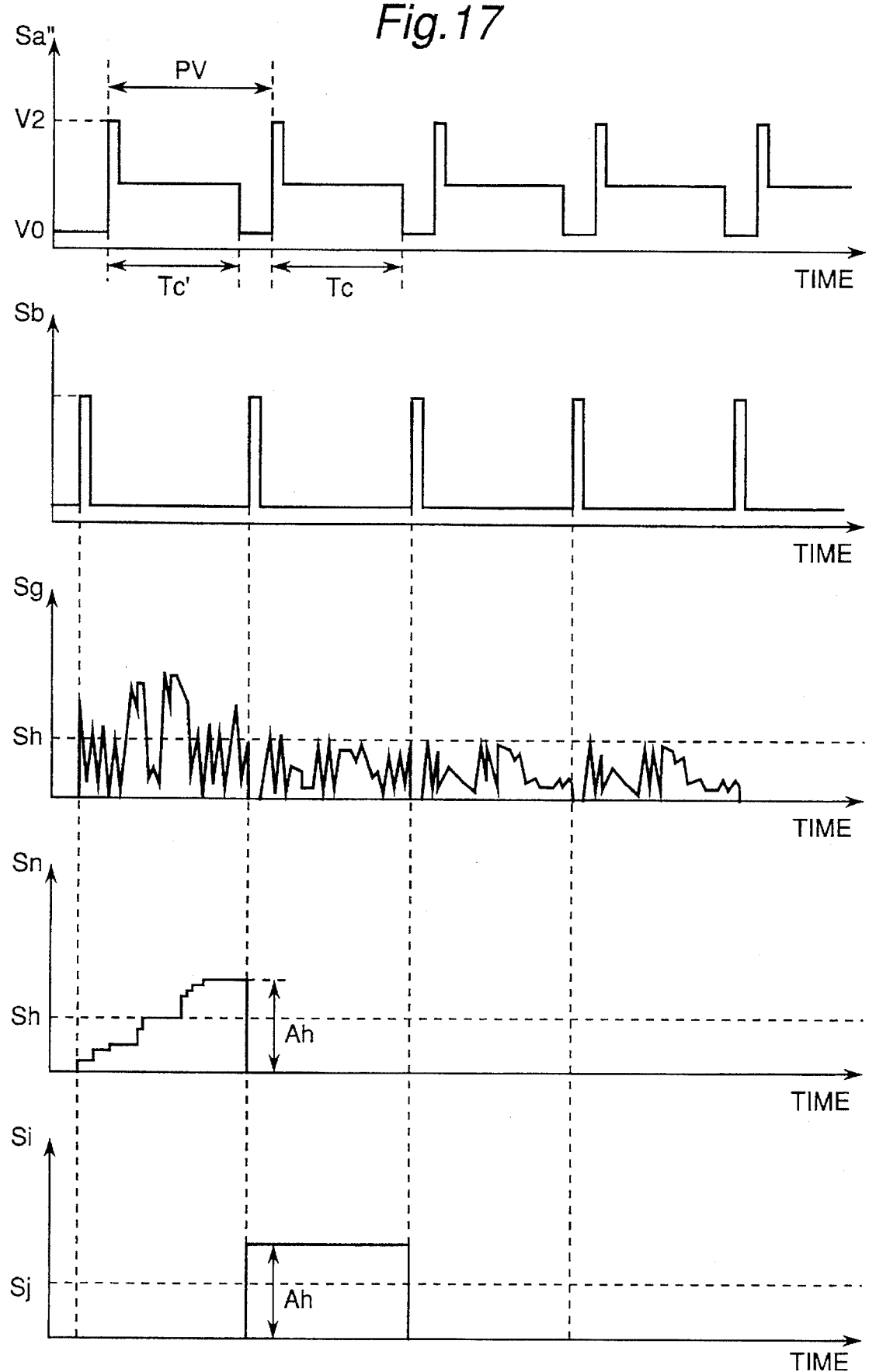
FIG. 17 is a graph showing various wave forms appeared in the imaging apparatus of FIG. 6.

Referring to FIG. 17, wave forms of signal Sa", Sb, Sg, Sn, and Si are shown. Every time when the signal Sg becomes greater than the signal Sh, the signal Sn is incremented by one. The signal Sn is outputted to the memory 15 at the leading edge of the signal Sb, so that a value Ah that the counter 14 counted is stored in the memory 15 as the signal Si. Then, thus stored value Ah is compared with the signal Sj. When the value Ah is smaller than the signal Sj, the modified accumulation controls signal Sa" which is changed to the zero level V0 from the first level V1 after the period Tc'. When the value Ah is greater than the signal Sj, the modified accumulation controls signal Sa" having the same wave of the signal Sa' is produced. Thus, the accumulating charge selector 5 changes the time Tc (Tc') for switching the accumulative charge level QAC of the image pickup device 1 from the first level Q1 to the second level Q0. Furthermore, the intermediate level Qm of the image pickup device 1 is changed.

Specifically, according to this embodiment, the members 12, 13, 14, 15, 16, and 17 controls the image pickup device 1 to change its dynamic range so that the image signal Se is kept to be smaller than the reference value Sj. As a result, the dynamic range of the image pickup device 1 can be adjusted actively for the light image incident to the image pickup device 1 suitably.

Figure 7:
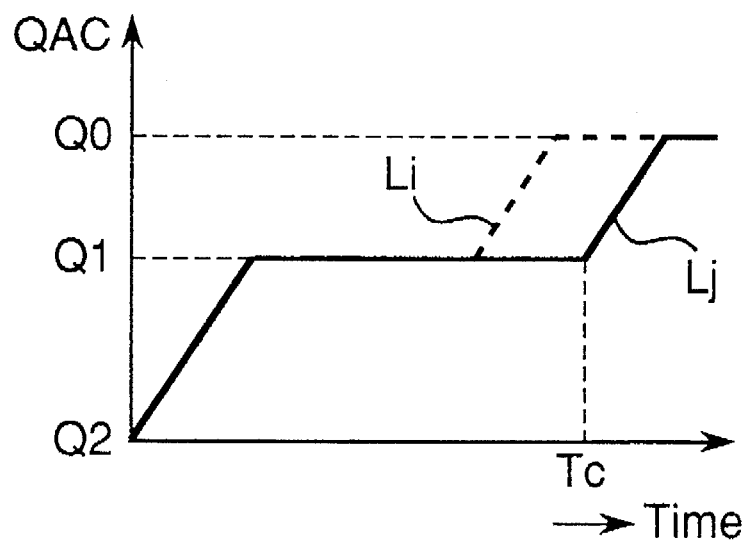
FIG. 7 is a graph showing a relationship between the electric charge accumulated in an image pickup device used in the imaging apparatus of FIG. 6 with respect to the charging time.
Figure 8:
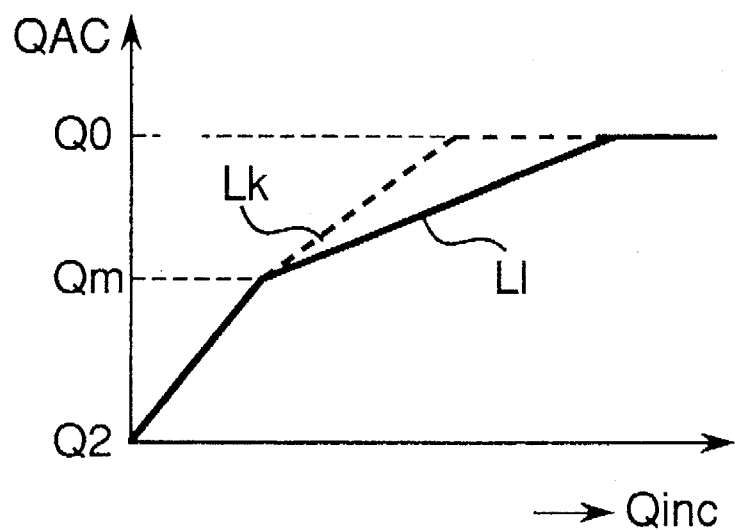
FIG. 8 is a graph showing a relationship between the electric charge accumulated in the image pickup device of FIG. 6 with respect to the quantity of light incident thereon.

Referring to FIGS. 7 and 8, electric charge accumulation characteristics of the image pickup device 1 of FIG. 6 are shown. In this embodiment, the accumulating charge selector 5 operates such that the image pickup device 1 sequentially actively changes its charge accumulative level from the intermediate level Q1 to the saturation level Q0 according to the incidental light to the device 1.

In FIG. 7, the quantity of accumulated electric charge QAC of the image pickup device with respect to incidental period is indicated by a solid line Lj. A dot line Li indicates the line Lb of FIG. 2 (the first embodiment). As specifically shown by the solid line Lj, the image pickup device 1 stays at the intermediate level Q1 longer than the that of the first embodiment.

In FIG. 8, the quantity of accumulated electric charge QAC of the image pickup device with respect to the quantity of incidental light Qinc is indicated by a solid line Ll. A dot line Lk indicates the line Ld of FIG. 3 (the first embodiment). By keeping the image pickup device at the intermediate level Q1 according to the incidental light to the device 1, the dynamic range of the device 1 is expanded actively.

Figure 9:
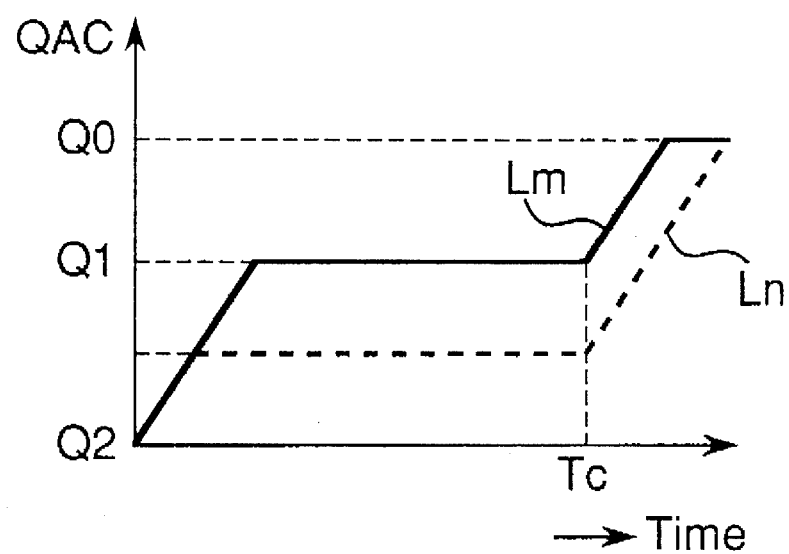
FIG. 9 is a graph similar to FIG. 7, but the intermediate level Q1 of the image pickup device is changed.
Figure 10:
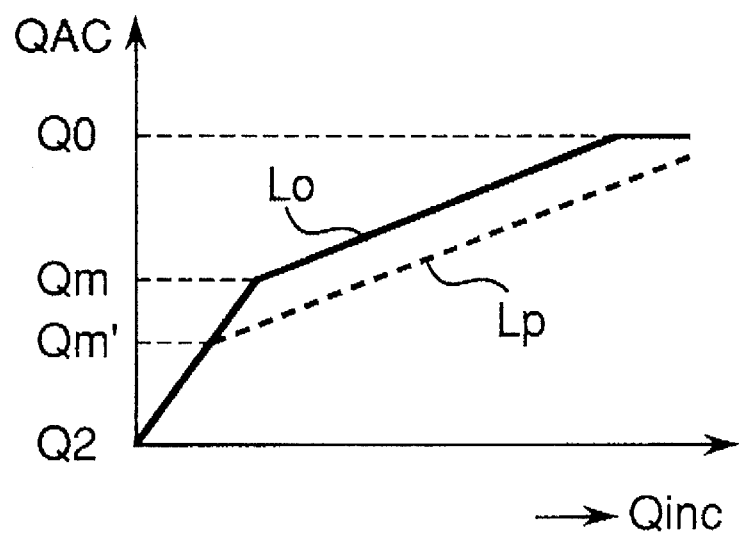
FIG. 10 is a graph similar to FIG. 8, but the intermediate level Q1 of the image pickup device is changed.

Referring to FIGS. 9 and 10, electric charge accumulation characteristics of the image pickup device 1 of FIG. 6 when the intermediate level Qm (Q1) of the image pickup device 1 is changed are shown.

In FIG. 9, the quantity of accumulated electric charge QAC of the image pickup device with respect to incidental period is indicated by the solid line Lm. A Lot line Ln indicates the line Lb of FIG. 2 (the first embodiment).

In FIG. 10, the quantity of accumulated electric charge QAC of the image pickup device with respect to the quantity of incidental light Qinc is indicated by the solid line Lo. A dot line Lp indicates the line Ld of FIG. 3 (the first embodiment). As apparent from the above, the dynamic range of the image pickup device 1 can be adjusted actively for the light image incident to the image pickup device 1 suitably.

Figure 11:
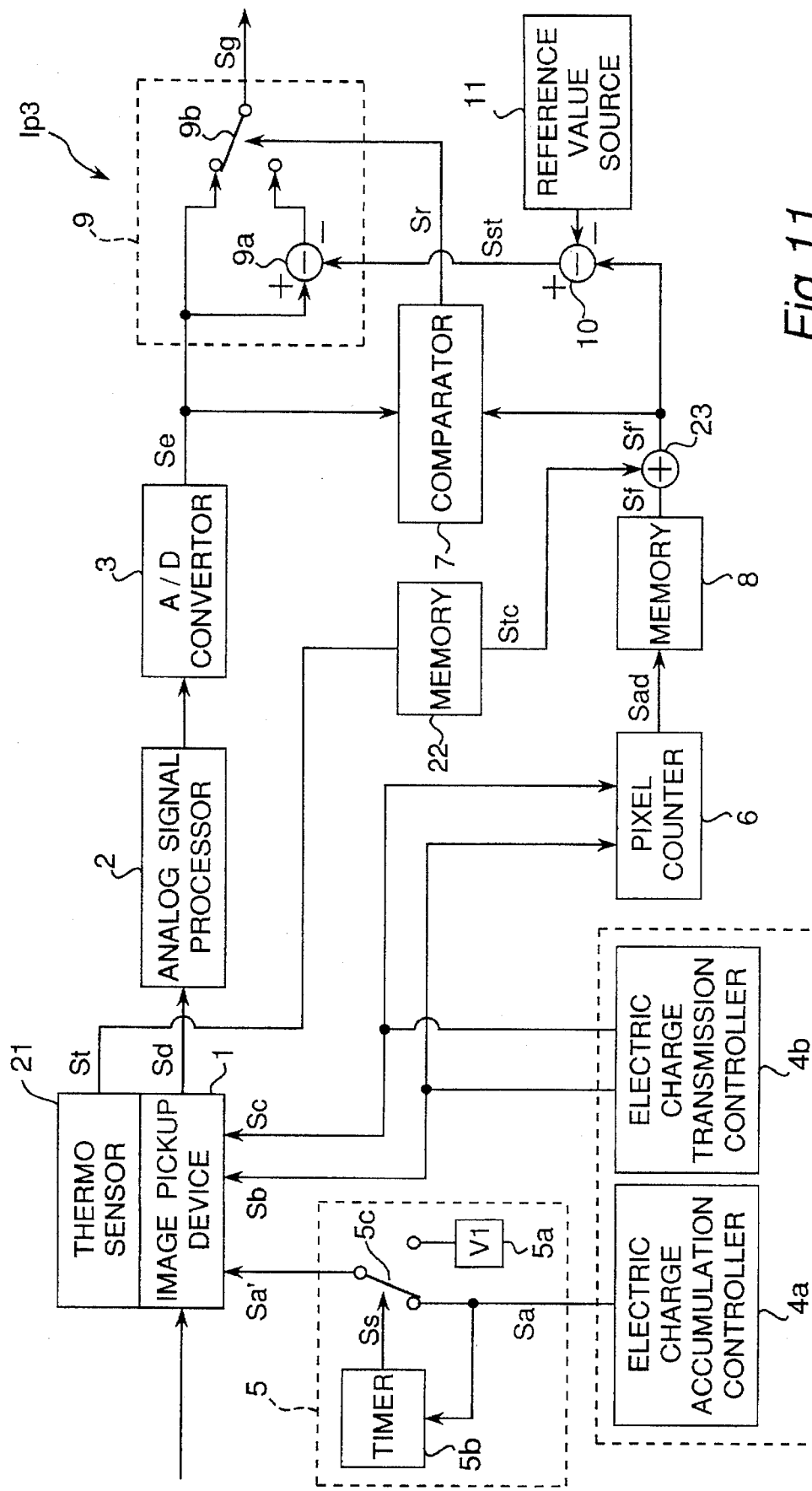
FIG. 11 is a block diagram showing an imaging apparatus according to a third embodiment of the present invention.

Third embodiment:

Referring to FIG. 11, an imaging apparatus according to a third embodiment of the present invention is shown. The imaging apparatus Ip3 has a construction similar to that of FIG. 1, but the following members are additionally provided.

A thermo sensor 21 is provide beside the image pickup device 1 for detecting the temperature therearound to produce a temperature signal St. A third memory 22 storing a temperature conversion data is connected to the thermo sensor 21 for receiving the temperature signal St. The third memory 22 outputs a compensation coefficients Stc corresponding to the temperature signal St based on the conversion data therein. An adder 23 is provided just after the first memory 8, and is connected to the third memory 22 for receiving the signal Sf and the compensation coefficients Stc therefrom, respectively. The adder 23 adds the coefficients to the reference charge signal Sf and produce a compensated reference charge signal Sf' wherein the thermal affection to the obtained image signal is compensated by the coefficients Stc.

It is noted that the charge amount that the image pickup device 1 can actually accumulate therein may vary according to the temperature thereat or the ambient temperature. In this case, the data stored in the first memory 8 is useless as the reference value for the noise removing operation. For solving this thermal affection to the image pickup device 1, the above members 21, 22, and 23 are provided. Therefore, according to this embodiment, the dynamic range can be improved without the image degradation even when such the image pickup device used changes its accumulative charge according to the temperature.

Figure 18:
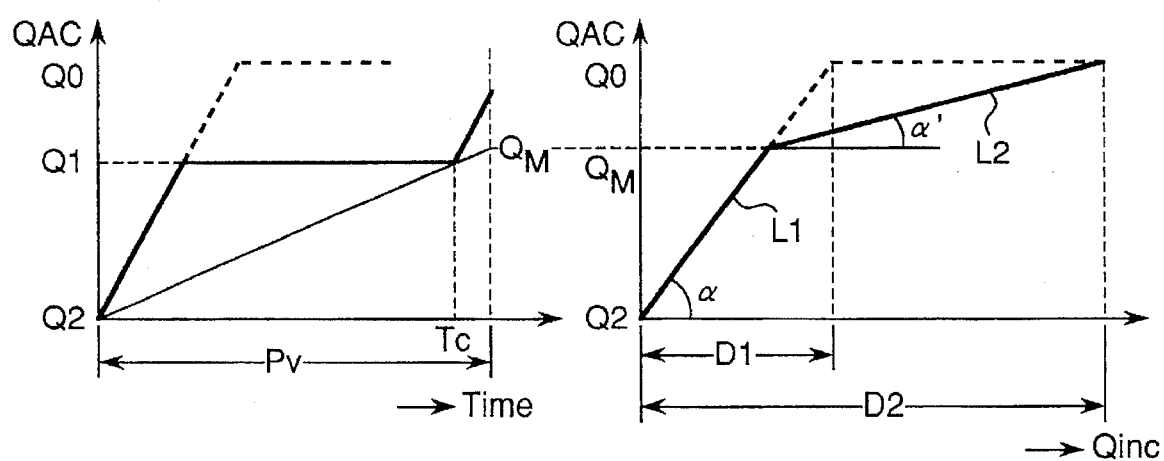
FIG. 18 is a graph in assistance of explaining the dynamic range of the imaging apparatus according to the present invention.

With reference to FIG. 18, the improved dynamic range of the image pickup device according to the present invention is described. In FIG. 18, electric charge accumulation characteristics of the image pickup device 1 according to the present invention are shown. The quantity of accumulated electric charge QAC of the image pickup device with respect to the quantity of incidental light Qinc is indicated by the solid lines L1 and L2 having inclination angles $\alpha$ and $\alpha'$, respectively. The dot line indicates that of the conventional image pickup device having a dynamic range D1. The dynamic range D2 of the image pickup device 1 according to the present invention can be obtained as described bellow.

The dynamic range D1 can be expressed by the following equation of $$D1 = Q0/\alpha \qquad (1).$$

The inclination $\alpha'$ of the line L2 can be expressed by the following equation of $$\alpha' = (Pv - Tc)\alpha/Pv \qquad (2).$$

The intermediate level QM can be expressed the following equation of $$QM = Q1 \cdot Pv/Tc \qquad (3).$$

The dynamic range D2 according to the present invention can be expressed by the following equation $$\begin{aligned} D2 &= QM/\alpha + (Q0 - QM)/\alpha' \\ &= 1/\alpha \{QM + (Q0 - QM) \cdot Pv/(Pv - Tc)\}. \end{aligned} \qquad (4)$$

Based on the equations (1), (2), (3) and (4), the following equation is obtained.

$$D2 = Pv/Tc \{1 - (Pv - Tc)/Tc \cdot Q1/Q0\} \cdot D1 \qquad (5).$$

By setting each of parameters in the equation (5), the image pickup device having a dynamic range desirably expanded can be obtained.

As apparent from the above, according to the imaging apparatus of the present invention, the dynamic range of the image pickup device can be expanded to express the incidental light thereto having a wider range as an accumulated electric charge amount. Furthermore, it is also possible to control the image pickup device to have the dynamic range suitably enhanced according to the incidental light.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An imaging apparatus comprising:

an image pickup device for producing an image signal indicative of an object image for a predetermined imaging period;

a control means for controlling an amount of electric charge that said image pickup device can accumulate therein; and an accumulative electric charge amount switch means for switching said image pickup device to a first accumulative electric charge amount level and to a second accumulative electric charge amount level greater than said first accumulative electric charge amount level within said imaging period.

2. An imaging apparatus as claimed in claim 1, further comprising:
   a comparator means for comparing said image signal with a predetermined reference signal to produce a control signal; and
   a compensation means for compensating said image signal based on said control signal.

3. An imaging apparatus as claimed in claim 2, further comprising a first reference signal source for storing the data corresponding to said first accumulative electric charge amount level as said predetermined reference signal.

4. An imaging apparatus as claimed in claim 2, wherein said predetermined reference signal corresponds to a maximum amount of electric charge that said image pickup device can accumulate therein.

5. An imaging apparatus as claimed in claim 3, wherein said first reference signal source stores the data corresponding to a maximum amount of electric charge that said image pickup device can accumulate therein.

6. An imaging apparatus as claimed in claim 1, further comprising:
   a comparator means for comparing said image signal with a predetermined reference signal to produce a control signal; and
   a switch timing control compensation means for controlling the timing when said accumulative electric charge amount switch means switches said image pickup device based on said control signal.

7. An imaging apparatus as claimed in claim 6, wherein said predetermined reference signal is the maximum level that said image pickup device can output.

8. An imaging apparatus as claimed in claim 1, further comprising:
   a comparator means for comparing said image signal with a predetermined reference signal to produce a control signal; and
   an accumulative electric charge amount level control means for controlling the level of said first accumulative electric charge amount level based on said control signal.

9. An imaging apparatus as claimed in claim 8, wherein said predetermined reference signal is the maximum level that said image pickup device can output.

10. An imaging apparatus as claimed in claim 1, wherein said accumulative charge amount switch means further switches said image pickup device to a third accumulative electric charge amount level smaller than said first accumulative electric charge amount level.

11. An imaging apparatus as claimed in claim 10, wherein said third accumulative electric charge amount level corresponds to a zero accumulation level.

12. An imaging apparatus as claimed in claim 10, wherein said accumulative charge amount switch means switches said image pickup device in order of said third, first and second levels.

13. An imaging apparatus as claimed in claim 12, further comprising:
   a comparator means for comparing said image signal with a predetermined reference signal to produce a control signal; and
   a compensation means for compensating said image signal based on said control signal.

14. An imaging apparatus as claimed in claim 12, further comprising:
   a comparator means for comparing said image signal with a predetermined reference signal to produce a control signal; and
   a switch timing control compensation means for controlling the timing when said accumulative electric charge amount switch means switches said image pickup device based on said control signal.

15. An imaging apparatus as claimed in claim 14, wherein said predetermined reference signal is the maximum level that said image pickup device can output.

16. An imaging apparatus as claimed in claim 12, further comprising:
   a comparator means for comparing said image signal with a predetermined reference signal to produce a control signal; and
   an accumulative electric charge amount level control means for controlling the level of said first accumulative electric charge amount level based on said control signal.

17. An imaging apparatus as claimed in claim 1, further comprising:
   a temperature detector means for detecting the temperature of said image pickup device to produce a temperature signal; and
   a compensation means for compensating said image signal based on said temperature signal.

18. An imaging apparatus as claimed in claim 1, further comprising:
   a temperature detector means for detecting the temperature at the ambience of said image pickup device to produce a temperature signal; and
   a compensation means for compensating said image signal based on said temperature signal.

19. An imaging apparatus as claimed in claim 1, wherein said second accumulative electric charge amount level corresponds to the maximum amount that said image pickup device can accumulate.

20. An imaging apparatus as claimed in claim 1, wherein the accumulative electric charge amount switch means includes timer means for determining when to switch said image pickup device.

21. An imaging apparatus as claimed in claim 1, wherein the accumulative electric charge amount switch means switches said image pickup device after a predetermined period of time during the imaging period.

* * * * *

UNITED STATES PATENT AND TRADE MARK OFFICE
CERTIFICATE OF CORRECTION

PATENT NO.   : 5,642,163
DATED        : June 24, 1997
INVENTOR(S)  : Watari et al.

It is certified that error appears in the above-identified patent and that said Letters Patent is hereby corrected as shown below:

On the cover page, item [56] References Cited add the following:

U.S. PATENT DOCUMENTS
5,055,667  10/1991  Sayag

FOREIGN PATENT DOCUMENTS
0 484 135  5/1992   EPO
0 573 235  12/1993  EPO
0 599 570  6/1994   EPO
0 440 563  8/1991   EPO

OTHER DOCUMENTS
European Search Report dated 10/17/96.

On the cover page, item [57] Abstract, line 8, delete "deice" and insert therefor --device--.

Signed and Sealed this

Twenty-fourth Day of November, 1998

Attest:

BRUCE LEHMAN

*Attesting Officer*          *Commissioner of Patents and Trademarks*